US010462639B2

(12) United States Patent
Adams et al.

(10) Patent No.: US 10,462,639 B2
(45) Date of Patent: Oct. 29, 2019

(54) ENHANCED GATEWAY SAFETY SYSTEM

(71) Applicant: STRAX TECHNOLOGIES, LLC, Boca Raton, FL (US)

(72) Inventors: Scott H. Adams, Boca Raton, FL (US); Thomas J. Margetta, Boca Raton, FL (US); Russell Orzel, Boca Raton, FL (US)

(73) Assignee: STRAX Technologies, LLC, Boca Raton, FL (US)

( * ) Notice: Subject to any disclaimer, the term of this patent is extended or adjusted under 35 U.S.C. 154(b) by 0 days.

(21) Appl. No.: 15/879,545

(22) Filed: Jan. 25, 2018

(65) Prior Publication Data

US 2018/0152825 A1  May 31, 2018

Related U.S. Application Data

(63) Continuation of application No. 15/160,162, filed on May 20, 2016, now Pat. No. 9,918,210.

(Continued)

(51) Int. Cl.
*H04W 4/14* (2009.01)
*H04W 4/90* (2018.01)
(Continued)

(52) U.S. Cl.
CPC ............ *H04W 4/90* (2018.02); *H04W 4/02* (2013.01); *H04W 4/06* (2013.01); *H04W 88/02* (2013.01)

(58) Field of Classification Search
CPC .......... H04W 4/90; H04W 4/12; H04W 4/22; H04W 76/50; H04W 4/02; H04W 4/14;
(Continued)

(56) References Cited

U.S. PATENT DOCUMENTS 6,563,919 B1 * 5/2003 Aravamudhan ........ H04L 29/06
370/401
6,587,545 B1 * 7/2003 Antonucci .............. H04M 3/42
379/37

(Continued)

OTHER PUBLICATIONS

PCT International Search Report and Written Opinion issued in PCT International Application No. PCT/US2016/033508 dated Sep. 1, 2016.

(Continued)

*Primary Examiner* — Nathan S Taylor
(74) *Attorney, Agent, or Firm* — Greenberg Traurig, LLP; Chinh H. Pham; Todd C. Basile

(57) ABSTRACT

A method comprising receiving non-voice information concerning an emergency event captured by at least one electronic device; selecting a responding agency to receive the non-voice information, based on at least one of a unique identifier and location information; and directing the non-voice information to the selected agency, via a broadband internet connection, to provide enhanced situational awareness regarding the emergency event to a responding agent at the selected agency. A method comprising receiving non-voice information concerning an emergency event; selecting a responding agency to which to direct the non-voice information; processing the non-voice information to be compatible with at least one of an intake or dispatch system utilized by the selected agency; and directing the processed non-voice information to the selected agency, via a broadband internet connection, to provide enhanced situational awareness regarding the emergency event to a responding agent at the selected agency.

17 Claims, 11 Drawing Sheets

Related U.S. Application Data

(60) Provisional application No. 62/164,836, filed on May 21, 2015.

(51) Int. Cl.
*H04W 4/06* (2009.01)
*H04W 4/02* (2018.01)
*H04W 88/02* (2009.01)

(58) Field of Classification Search
CPC .............. H04W 4/16; H04W 52/0261; H04W 52/0296; H04W 92/02; H04W 16/14; H04W 24/02; H04W 24/10; H04W 28/14; H04W 36/00; H04W 4/20; H04M 3/5116; H04M 1/72536; H04M 2242/30; H04M 3/42382; H04M 3/5183
USPC ....... 455/404.1, 404.2, 466, 417, 426.1, 445
See application file for complete search history.

(56) References Cited

U.S. PATENT DOCUMENTS

| | | | | |
|---|---|---|---|---|
| 6,744,856 | B2* | 6/2004 | Karnik | H04M 7/0045 379/37 |
| 7,933,385 | B2* | 4/2011 | Dickinson | G08B 27/005 370/252 |
| 8,401,154 | B2* | 3/2013 | Boni | H04M 11/04 379/45 |
| 8,565,714 | B2* | 10/2013 | Patel | H04M 3/42195 455/404.1 |
| 8,929,849 | B1* | 1/2015 | Dudziak | H04W 4/12 455/404.1 |
| 9,319,859 | B2* | 4/2016 | Clawson | H04W 4/90 |
| 2005/0113078 | A1* | 5/2005 | Deitrich | H04W 4/16 455/417 |
| 2006/0147008 | A1* | 7/2006 | Blossom | H04M 3/5307 379/202.01 |
| 2010/0002846 | A1* | 1/2010 | Ray | G10L 13/043 379/37 |
| 2010/0003954 | A1* | 1/2010 | Greene | G10L 13/043 455/404.1 |
| 2010/0231714 | A1* | 9/2010 | Flores | G08B 13/19613 348/143 |
| 2011/0064205 | A1* | 3/2011 | Boni | H04M 11/04 379/45 |
| 2011/0086607 | A1* | 4/2011 | Wang | H04M 3/5116 455/404.1 |
| 2011/0111728 | A1* | 5/2011 | Ferguson | H04M 1/72541 455/404.2 |
| 2012/0314625 | A1* | 12/2012 | Bruce | H04L 51/20 370/259 |
| 2013/0052984 | A1* | 2/2013 | Mohler | H04W 4/22 455/404.2 |
| 2013/0102269 | A1* | 4/2013 | Ray | G10L 13/043 455/404.1 |
| 2013/0149987 | A1* | 6/2013 | Cheng | H04L 67/1002 455/404.1 |
| 2013/0252649 | A1* | 9/2013 | Siomina | H04W 4/02 455/466 |
| 2013/0303104 | A1* | 11/2013 | Venkatachalam | H04W 4/90 455/404.1 |
| 2014/0099909 | A1* | 4/2014 | Daly | H04L 51/00 455/404.1 |
| 2014/0213212 | A1* | 7/2014 | Clawson | H04W 4/90 455/404.1 |
| 2014/0287714 | A1* | 9/2014 | Marshall | H04W 4/12 455/404.2 |
| 2015/0038102 | A1* | 2/2015 | Yoakum | H04M 3/42221 455/404.1 |
| 2015/0044985 | A1* | 2/2015 | Wang | H04W 4/70 455/404.2 |
| 2016/0345153 | A1 | 11/2016 | Adams et al. | |
| 2017/0318446 | A1* | 11/2017 | Lee | H04W 4/02 |

OTHER PUBLICATIONS

Non-Final Office Action is U.S. Appl. No. 15/160,162 dated Jun. 1, 2017.

* cited by examiner

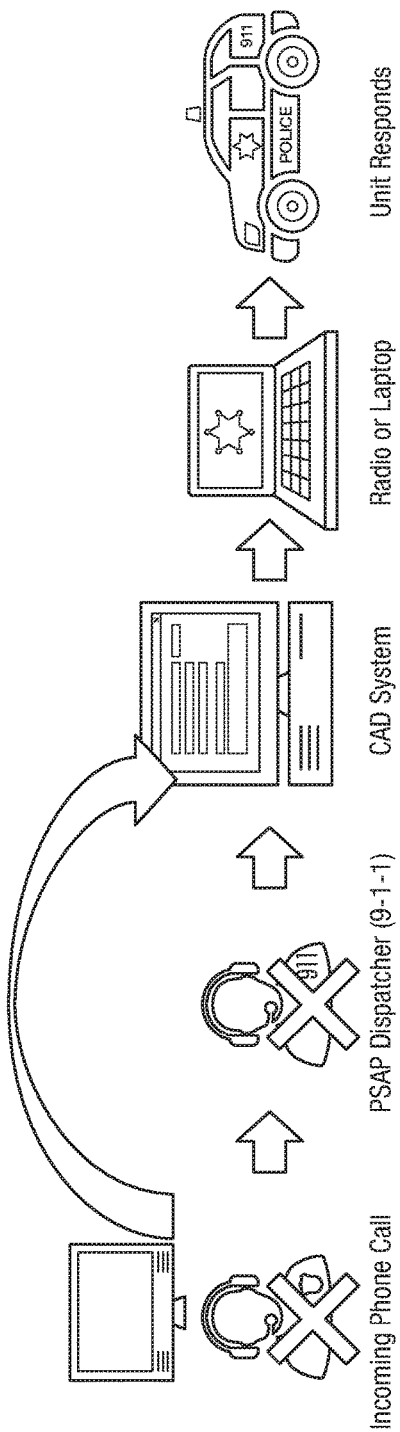
Fig. 1 – PRIOR ART
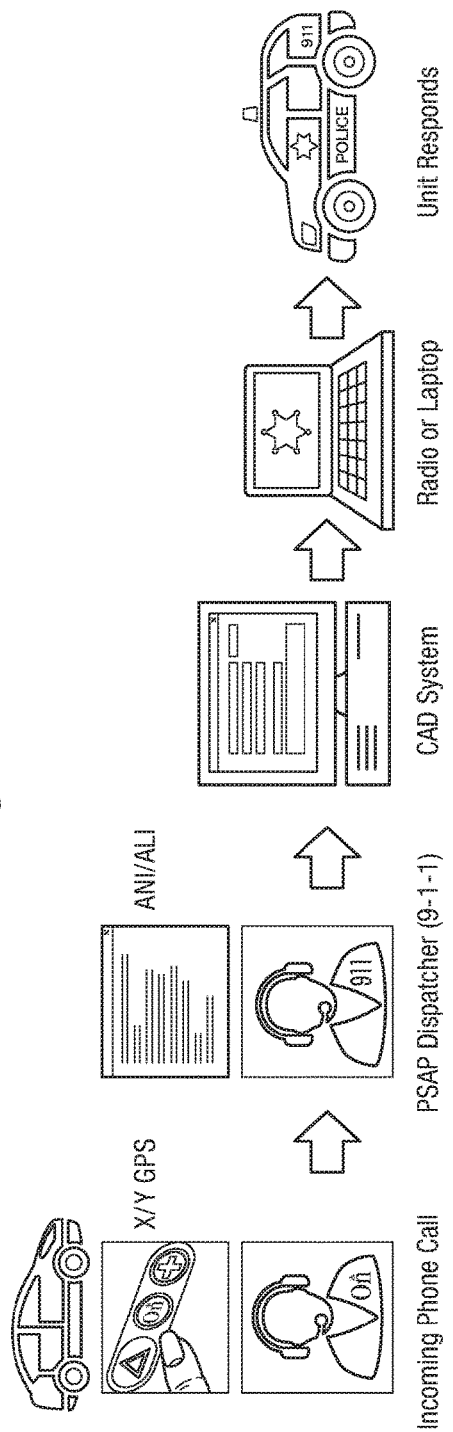
Fig. 2 – PRIOR ART

ENHANCED GATEWAY SAFETY SYSTEM

RELATED U.S. APPLICATIONS

This application is a continuation patent application of U.S. patent application Ser. No. 15/160,162, filed May 20, 2016, which claims priority to U.S. Provisional Patent Application Ser. No. 62/164,836, filed May 21, 2015, each of which is incorporated herein by reference in their entireties.

TECHNICAL FIELD

The present invention relates to systems and methods for interfacing a variety of third-party software applications with a variety of public/private safety agencies to facilitate communication of non-voice information for improving situational awareness of an agency agent during response to an emergency event.

BACKGROUND

Public Safety Answering Points (PSAPs) are call centers responsible for answering calls to an emergency telephone number for police, firefighting, ambulance, and other public-safety-related services. Most utilize existing telephony infrastructure, such as the public switched telephone network (PSTN) and/or public switched data network (PSDN) to receive information from callers regarding a crime, medical emergency, fire, or other public-safety-related event in progress. Such infrastructure typically supports only voice communications between callers and operators, which can make it difficult for a PSAP operator to quickly and accurately assess the nature of an event and its location, and to maintain constant situational awareness throughout the dispatch of and response by public safety responders.

Efforts have been made to develop solutions for providing PSAPs with additional sources of information beyond mere voice communications from a caller. One existing approach, as shown in FIG. 1, utilizes the automated secure alarm protocol (ASAP) to process and send information from alarm monitoring stations to PSAPs. The ASAP protocol is a direct link from a Central Station Computer to a computer at the PSAP dispatch center which allows the PSAP computer to receive and process data independent of verbal data communication between a caller and PSAP dispatcher. The information goes directly into the computer aided dispatch (CAD) system, and then the dispatcher sends the information to responding units by radio or laptop computer. PSAPs must choose to integrate the ASAP protocol into their legacy systems, and as of today, less than 1% of PSAPs have participated. Another existing approach, as shown in FIG. 2, is a native 9-1-1 telematic method that sends automated location information (ANI) and automated number identification (ANI) from a device (e.g., an Onstar® system in a vehicle) to a PSAP via a 9-1-1 trunk line in parallel with traditional voice communications between the caller and operator. Yet another approach, which is not expected to complete development for another 8 to 10 years, is the NG911 i3 Method, envisions full end-to-end Internet Protocol (IP) to deliver data information to PSAPs.

These and other solutions suffer from a number of disadvantages. Of the approximately 6000 PSAPs in the United States, most are operated independent of one another by local governments. Accordingly, many PSAPs utilize dissimilar technological infrastructures for receiving calls, dispatching public safety responders, and sharing relevant information public safety responders and other agencies. Further, many PSAPs have varying policies regarding whether and what kinds of relevant information they will accept from callers and devices in addition to typical voice communications. This lack of standardization across PSAPs makes it very difficult to develop third party software solutions for effectively and efficiently interfacing with a broad spectrum of PSAPs.

Further, many PSAP's have traditionally been reluctant to begin accepting enhanced location and profile data into their PSAP due to the overwhelming number of potential providers and the need for the 911 operators to have to learn the individual nuances and log-ins criteria for accessing each system. The traditional thinking is 'to be fair, if you allow for one, you must allow for all,' and therefore the flood gates remain closed as much as possible, with notable exceptions such as bank robbery response devices, which typically require a dedicated computer provided to a law enforcement agency and requiring specific training for each dispatcher.

Still further, none provide for leveraging the plethora of information available from mobile devices being carried or worn by most people today, such as smartphones and wearables. Integrated cameras, GNSS/GPS locators, accelerometers, health monitors, and other technologies within these mobile devices could provide large amounts of relevant information for enhancing situational awareness of PSAP operators.

In addition to PSAP's, other agencies often suffer from similar issues. For example, federal, state, and local public safety agencies (e.g., law enforcement, EMS, fire departments, etc.) may each utilize different infrastructure for the intake, management, and dissemination of information to responding units and other agencies. Similar issues also exist with private agencies, such as security and healthcare monitoring services, as most utilize varying infrastructure, both in terms of intake and forwarding of event information to PSAPs and other public safety agencies, as well as to other private agencies.

In light of these issues, it would be desirable to provide a standardized interface between PSAPs and callers for sharing additional information from mobile devices and other sources to assist with enhancing situational awareness during event response.

SUMMARY OF THE INVENTION

The present disclosure is directed to a method for communicating non-voice information concerning an emergency event to a responding agency. The method may include receiving, from a third-party system including at least one electronic device, non-voice information concerning an emergency event captured by the at least one electronic device; selecting a responding agency to receive the non-voice information, based on at least one of the following: a unique identifier of an agency pre-designated provided by the third-party system for responding to the emergency event, and information concerning a location of the at least one electronic device provided by the third-party system; and directing the non-voice information to the selected agency, via a broadband internet connection, to provide enhanced situational awareness regarding the emergency event to a responding agent at the selected agency.

In another aspect, the present disclosure is directed to another method for communicating non-voice information concerning an emergency event to a responding agency. The method may include receiving, from a third-party system including at least one electronic device, non-voice information concerning an emergency event, at least some of the non-voice information being captured by the at least one electronic device; selecting a responding agency to which to direct the non-voice information; processing the non-voice information to be compatible with at least one of an intake or dispatch system utilized by the selected agency; and directing the processed non-voice information to the selected agency, via a broadband internet connection, to provide enhanced situational awareness regarding the emergency event to a responding agent at the selected agency.

The methods of the present disclosure may be executed on a computing device via instructions stored on a non-transitory computer-readable medium.

BRIEF DESCRIPTION OF DRAWINGS

For a more complete understanding of this disclosure, reference is now made to the following description, taken in conjunction with the accompanying drawings, in which:

FIGS. 1 and 2 schematically depict prior art methods for providing information concerning an emergency event to a public safety answering point;

DESCRIPTION OF SPECIFIC EMBODIMENTS

Figure 3:
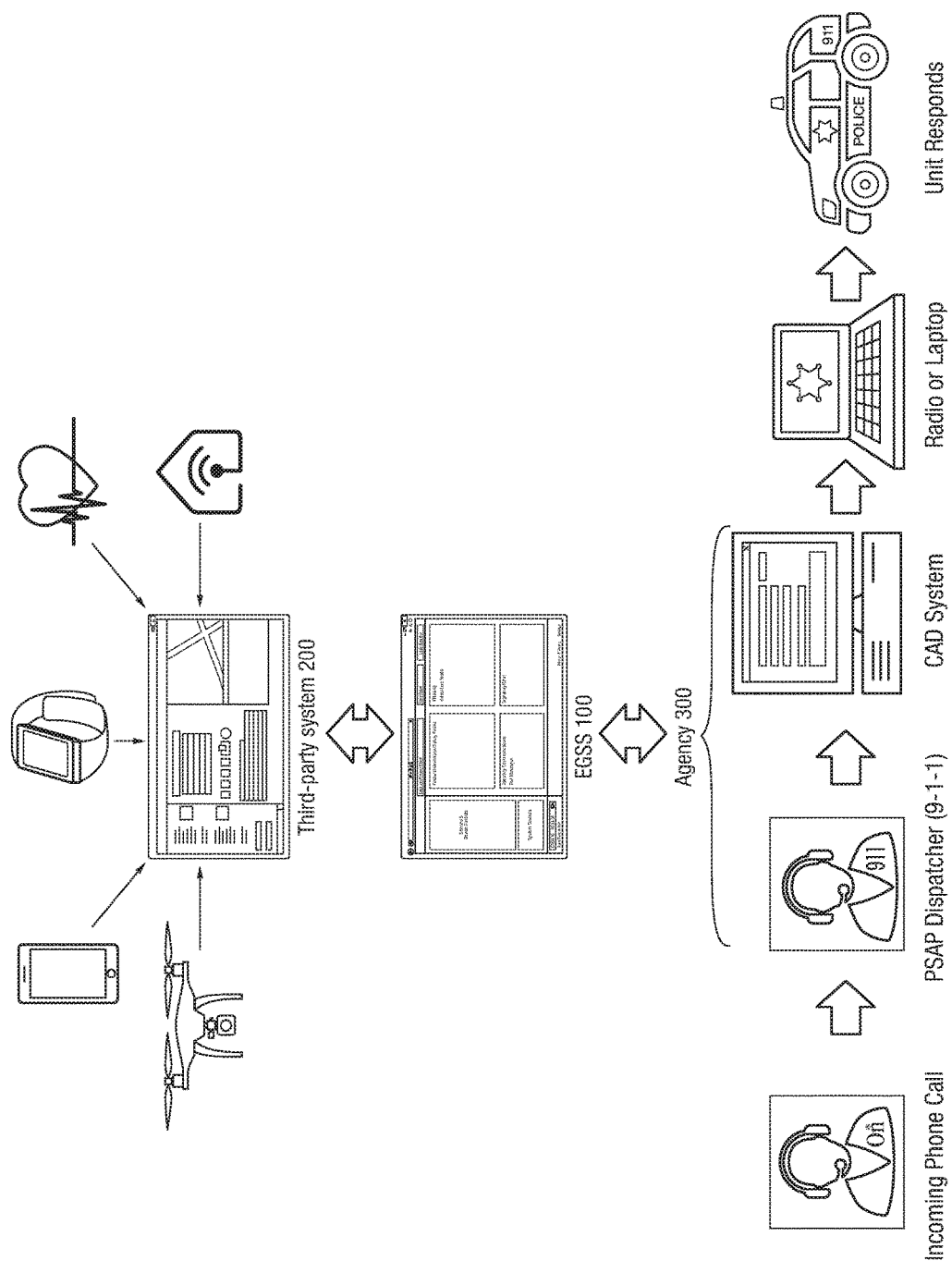
FIG. 3 schematically depicts a method for providing information concerning an emergency event to a responding agency, in accordance with one embodiment of the present disclosure.

Embodiments of the present disclosure provide an enhanced gateway safety system (EGSS) 100 for facilitating the communication of non-voice information 102 between one or more third-party system(s) 200 and one or more public or private agency(s) 300. Various embodiments of EGSS 100 may additionally or alternatively facilitate the transfer and/or sharing of non-voice information 102 between agencies.

As used in the present disclosure, agency 300 broadly includes any public or private entity, organization, agency, or company involved in event monitoring and/or response services. Example public entities include PSAPs, law enforcement agencies (e.g., police departments, FBI, Homeland Security), and public safety agencies (e.g., emergency medical services (EMS), fire departments, HAZMAT, nuclear emergency support team (NEST), Center for Disease Control (CDC) Outbreak Response Team (ORT)), amongst others. Example private entities include home monitoring/response companies (e.g. those that monitor security and/or fire alarms), and commercial security monitoring/response companies, amongst others. The present disclosure is not intended to be limited to only these illustrative examples, and one of ordinary skill in the art will recognize other suitable public or private entities, organizations, agencies, or companies with which EGSS 100 may interface and function within the scope of the present disclosure.

From time to time, the present disclosure may refer to agents 310 associated with agencies 300. Agents 310 broadly include any person, such as an operator, dispatcher, coordinator, or responder, associated with a given agency 310 that is involved in monitoring and/or responding to the event. The term agent 310 may further include existing systems for the intake, management, and dissemination of information to other agents and/or other agencies, such as Computer Aided Dispatch (CAD) systems.

The term event is intended to broadly encompass any number of situations in which it appears a subject (e.g., person, pet) may be in danger and possibly needs assistance from other persons. Illustrative examples of such events include, without limitation, medical emergencies, missing persons, and the like. The term event may also broadly encompass law enforcement situations in which a suspect needs to be contacted or apprehended by one or more persons. Illustrative examples of such events include, without limitation, criminal activity such as active shooter, assault, home invasion, high-speed chases, and drug interdiction, amongst others. Still further, the term event may broadly encompass commercial security situations such as, without limitation, breaking and entering, burglary, vandalism, and trespassing, amongst others.

Non-voice information 102 broadly includes any information provided independent of a voice-only call to agenc(ies) 300. For example, non-voice information 102 may include information concerning a location of a corresponding electronic device 220, which as later described in more detail, may be used to route non-voice information 102 to an appropriate agency. Non-voice information 102, in some embodiments, may further include any one or combination of audio/visual content (e.g., photo, video, omnidirectional speech), text content (e.g., text messages, SMS messages, Chat), inertial sensor readings (e.g., a direction, speed and/or acceleration at which the electronic device 222 is moving), vital sign sensor readings (e.g., pulse rate, body temperature, respiration rate of a user), and environmental sensor readings (e.g., ambient temperature, presence of smoke or toxins), amongst others. Non-voice information 102, in some embodiments, may additionally or alternatively include user profile information from third-party system 200. Example user profile information includes, but is not limited to, name, age, contact information, emergency contact information, description of the person, photo portrait, medical conditions (e.g., the child is autistic, or the elderly user has Alzheimer's and often wanders away), and any other relevant information about the user and/or the user's environment (e.g., home, commercial building).

It should be recognized that non-voice information 102 may include any information, independent of caller-to-agent voice communications via a voice-only call, that may be relevant or useful to enhancing the situational awareness of an agent at agency 300 in understanding and organizing a response to an emergency event. For the purposes of this disclosure, a voice-only call refers to a call placed with agency 300 via traditional telephony infrastructure (e.g., PSTN, PSDN), or in some cases, via Voice Over Internet Protocol (VOIP) or Voice Over LTE (VoLTE) communications.

Non-voice information 102, in various embodiments, may be provided by one or more electronic devices 220 of third-party system 200 with direct or indirect access to the internet. For example, in some embodiments, electronic device 220 may be a mobile electronic device 222, such as a smart phone, wearable device (e.g., smart watch, health monitor), remotely-piloted vehicle (e.g., unmanned aerial, land, water vehicles), or any other suitable electronic device. Many such mobile devices 222 include cameras, microphones, location technologies, accelerometers, gyroscopes, and other technologies capable of capturing non-voice information 102 that may be useful to an agent 310 in assessing the nature and priority of an event, ongoing developments throughout dispatch of responders, and during the response itself, amongst other critical phases and considerations. Example location technologies in or used by mobile devices 222 may include GNSS, GPS, cellular triangulation, augmented location technologies (such as those using radio waves, magnetic fields, acoustic signals, and other technologies to enhance the accuracy of or provide location in the absence of GNSS/GPS), and indoor positioning systems (such as those utilizing magnetic positioning, inertia navigation solutions, wifi signals, Bluetooth, RFID, cameras, proximity sensors, lasers, and other technologies). Example location information may include latitude/longitude coordinates of electronic device 220, other Cartesian coordinates of electronic device 220, a physical address at which the electronic device is located, and a location of the electronic device within a building or relative to one or more recognizable landmarks or objects.

Most people tend to carry or wear one or more mobile devices 222 on their person, making mobile devices 222 particularly useful for providing agent 310 with access to non-voice information 102 at or near the location of an emergency event involving the person carrying or wearing the device. For example, a mobile electronic device 222 such as a camera- and GPS-equipped smartphone could be used in connection with EGSS 100 to provide an agent 310 with GPS coordinates of a motor vehicle accident and live video of a person's injuries, thereby allowing the agent 310 (here, a dispatcher, for example) to quickly dispatch EMS responders to the location of the accident, while better and more quickly guiding the person in providing first aid until public safety responders arrive.

In other embodiments, electronic device 220 may be a stationary electronic device 224, such as a internet-of-things (IoT) connected device used in smart home and business applications. Many such IoT devices 224 contain cameras, microphones, sensors, and other technologies capable of capturing non-voice information 102 that may be useful to an agent 310 in assessing the nature and priority of an event, ongoing developments throughout dispatch of responders, and during the response itself, amongst other critical phases and considerations. For example, an IoT device 224 such as a Wi-Fi home monitoring camera (e.g., Nest Cam, Samsung SmartCam, Canary) could be used in connection with EGSS 100 to provide an agent 310 with video of home intruders, thereby allowing agent 310 to inform police responders of the number of suspects, the types of weapons they may be carrying, the location(s) of the intruders in the home, whether they have any hostages, and what the intruders are discussing, amongst other things. It should be noted that audio information, such as that captured by a microphone on the Wi-Fi camera, is considered non-voice information 102 as used in the present disclosure, as though it does contain verbal information (e.g., conversation amongst intruders), it is not verbal communication from a caller.

Third-party system 200, in various embodiments, may include a software application 210 for collecting, processing, transmitting, and/or displaying non-voice information collected by electronic devices 220, and in some cases, to control the operation of electronic devices 220. In various embodiments, software application 210 may be configured for local operation on electronic device 220; in other embodiments, software application 210 may be run on a remote computer or server in communication with electronic device 220. Most software applications 210 are developed by private companies and offer solutions specific to certain applications (e.g., home and commercial security) and technologies (e.g., certain types/brands of devices 220). As such, each collects and processes non-voice information 102 in different formats and ways—which, in many cases, are not directly compatible with approved formats and protocols used by intake and dispatch systems, such as Computer Aided Dispatch (CAD) systems, at agencies 300.

Referring now to FIG. 3, EGSS 100 in various embodiments, may act as a configurable gateway for interfacing third-party system 200 with agency 300. In the embodiment shown, EGSS 100 facilitates the communication of non-voice information from third-party system 200 to agency 300 via a broadband internet connection, independent of existing telephony infrastructure or proprietary networks. As configured, EGSS 100 may be used to provide non-voice information 102 to agency 300 without interfering with the primary method of telephony voice communications with agent 310.

Certain of the methods described herein may be implemented at least in part using a computer. In some aspects, described herein is a non-transitory computer-readable medium storing computer-executable instructions for facilitating the communication of non-voice information from third-party system 200 to agency 300 via a broadband internet connection, independent of existing telephony infrastructure or proprietary networks. In some aspects, described herein is a non-transitory computer-readable medium storing computer-executable instructions for facilitating the communication of non-voice information from third-party system 200 to agency 300 via a broadband internet connection, independent of existing telephony infrastructure or proprietary networks. The instructions may be embodied in a computer program product comprising a computer-readable medium.

EGSS 100, in various embodiments, may additionally provide for communications in the opposite direction, from agency 300 to third-party system 200. Bi-direction communications, in an embodiment, may allow for agency 300 to confirm to third-party system 200 that it has received non-voice information 102 sent from third-party system 200. In another embodiment, bi-directional communications provided by EGSS 100 may allow for agency 300 and a person carrying mobile electronic device 222 to exchange text messages, which may be useful in cases where traditional voice communications is impaired by ambient noise or injury, or inadvisable due to risk of being heard by an intruder. Similarly, in a related embodiment, agency 300 could send instructional diagrams or videos to third-party system 200 for display to aid the person in performing first aid. In yet another embodiment, bi-directional communications via EGSS 100 may provide agency 300 with the ability to directly request information from third-party system 200. Additionally or alternatively, agency 300 could control electronic device 220 in some embodiments. Still further, EGSS 100 in some embodiments, may support voice communications between parties in addition to the communication of non-voice information 102.

In addition to acting as an interface between third-party system 200 and agency 300, in various embodiments, EGSS 100 may further organize and consolidate non-voice information received from third-party system 200 into a common user interface 170. As later described, this allows EGSS 100 to provide a consistent user experience to the agent 310, regardless of the types of information being provided by any given third-party system 200 solution, thereby minimizing training time and helping the agent 310 to intuitively interact with non-voice information 102 provided by application 200 throughout an event.

System Architecture of EGSS 100

Figure 4:
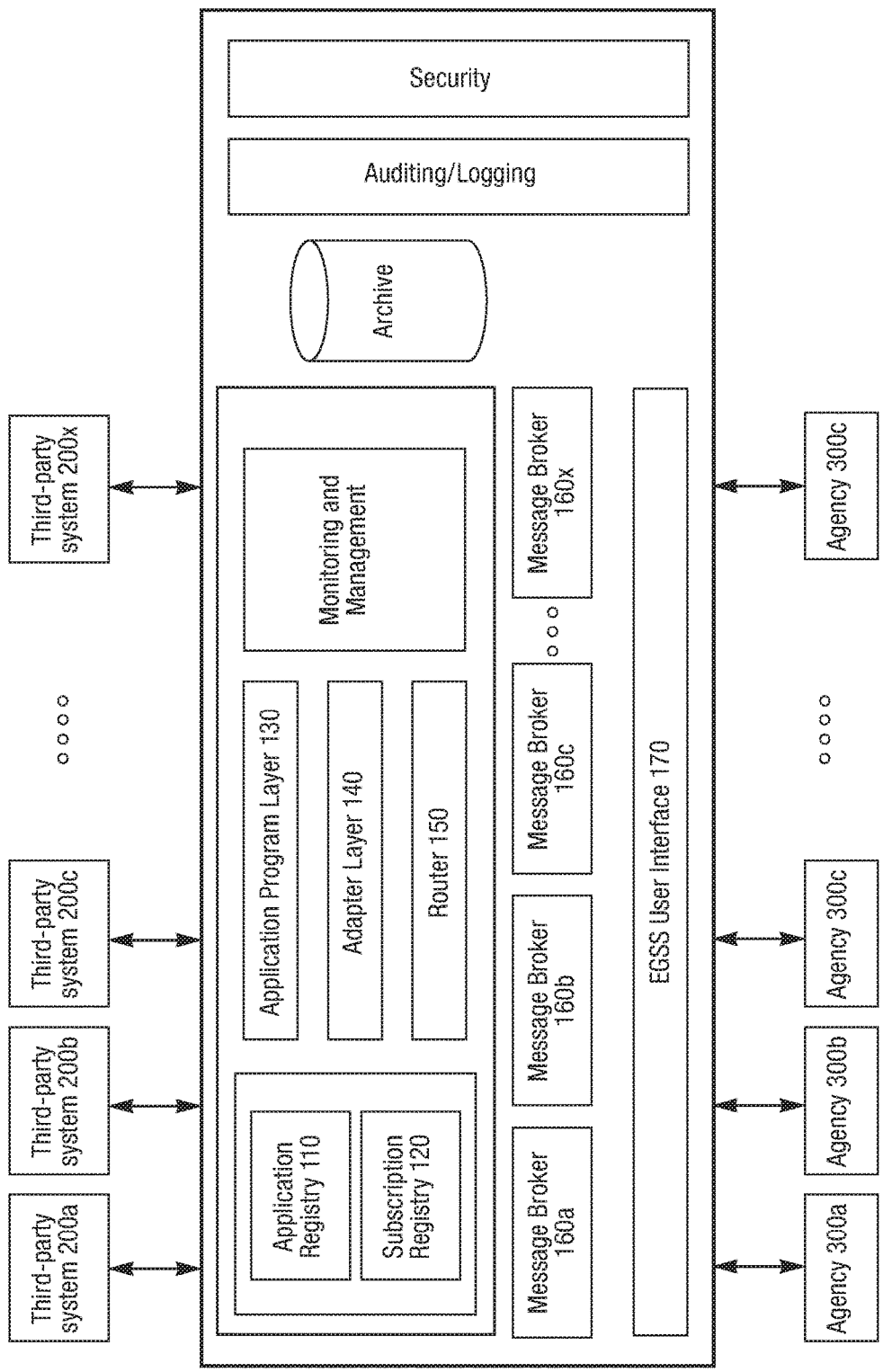
FIG. 4 schematically depicts a system for providing information concerning an emergency event to a responding agency, in accordance with one embodiment of the present disclosure.

Referring now to FIG. 4, system 100 in various embodiments may serve as an aggregator for a variety of legacy and future software application(s) 200a-x to interface with a variety of legacy and future systems used by PSAP(s) 300a-x via a broadband internet connection.

EGSS 100, in various embodiments, may utilize an open architecture that allows for application(s) 200 and PSAP(s) 300 to easily interface with EGSS 100. EGSS 100, in various embodiments, may organize communications inputs from application 200 and agency 300, and consolidate data provided by application 200 in one common platform that can be used for a variety of 9-1-1 telecommunicator equipment at agency 300. In this way, developers need not create multiple versions of application 200, each tailored to the particular infrastructure and policies of each individual agency 300. Similarly, the open architecture of EGSS 100 may allow each agency 300 to maintain control over which applications 200 they choose to interface with and receive data from. Accordingly, EGSS 100 may provide the flexibility needed by both application developers and agencies 300 to efficiently and effectively share information 102.

Application Registry 110:

Application registry 110 allows a solution provider to register its third-party system 200 with EGSS 100. The solution provider provides pertinent information related to its third-party system 200 such as what non-voice information 102 will be delivered to EGSS 100 during an event, and what actions will be available for the agent 310 during the event. For example, in the context of a third-party system 200 designed for use during a non-medical emergency (e.g., a robbery), a solution provider may register it software application to provide information concerning the location of the robbery, user profile information (e.g., name, age, contact information, emergency contact information, description of the person, photo portrait, medical conditions), and a full duplex communication path. Enabled features may allow the agent 310 to request location, talk with the user, mute and unmute the communication path, or turn on a "sounder" that will assist emergency personnel as they respond to the user.

Figure 5:
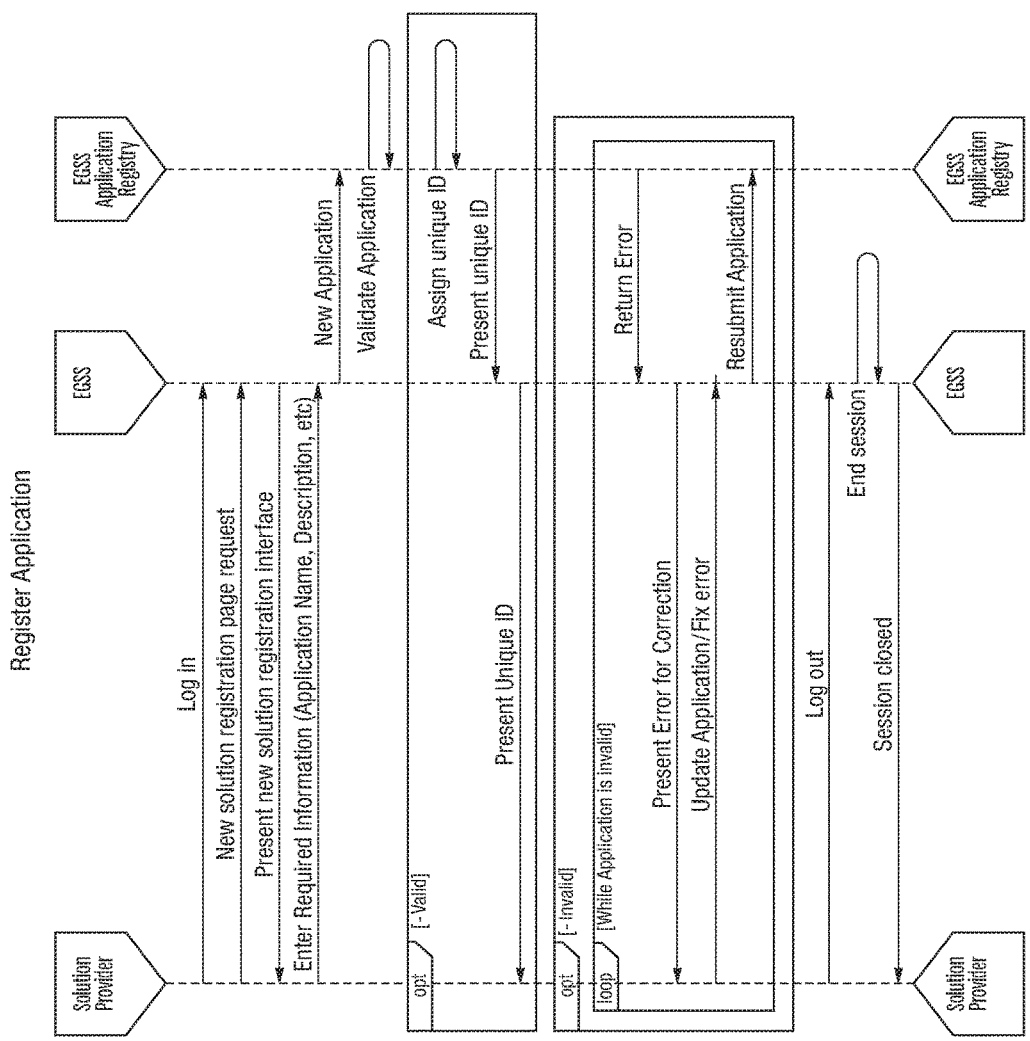
FIG. 5 depicts a representative workflow for registering a third-party software application with the system of FIG. 4, in accordance with one embodiment of the present disclosure.

Referring ahead to FIG. 5, in a representative registration process, the solution provider logins into the EGSS 100 platform and requests the "New Solution Registration" page.

After entering the required information in the "New Solution Registration" page, the request is submitted. Depending on the solution validation and approval process in effect, the solution provider's third-party system 200 is validated. If the application 200 is valid, the application 200 is registered within EGSS 100 and agencies 300 may begin to register for its use. If the application 200 is invalid, the solution provider is notified and provided with the ability to correct any errors.

Although FIG. 5 shows the process as a single serialized interaction with EGSS 100, the requested actions can be executed as individual interactions with EGSS 100.

In other embodiments, solution providers may instead submit its application 200 for separate review and approval before they can register with EGSS 100. It could also be that submission of a registration request starts the process. Once third-party system 200 is approved, the solution provider is notified and third-party system 200 becomes available.

It should be recognized that there may be suitable variants for the two basic examples described above, and that the registration process of the present application is not intended to be limited to just these examples.

Subscription Registry 120:

The Subscription Registry provides the ability for the agency 300 to register with EGSS 100, and control which solution provider's software applications 200 they are will to accept. This control, in various embodiments, is on an individual level, allowing each individual agency 300 to decide which individual software applications it will accept. Subscription registry 120, in some embodiments, may further allow agency 300 to select a subset of non-voice information 102 offered by a given third-party system 200 if the full suite is not desired or compatible with agency's 300 infrastructure or policies.

Application Program Interface (API) 130:

Referring again to FIG. 4, API 130 includes a set of routines, protocols and parameters used to deliver the EGSS 100 service. The API defines the structure of the routine calls and the parameters needed to deliver the solutions providers information to EGSS, as well as how EGSS will request information or action from the solution provider's solution.

Adapter Layer 140:

Adapter layer 140, if needed, may be configured to normalize the formats of non-voice information 102 received from third-party system 200, so that it may be presented in formats compatible with EGSS user interface 170. For example, video content may be supplied in numerous formats (e.g., MPEG-4, Flash, Quicktime, Windows Media Video); however, a given agency 300 may only accept or support video content in a specific predetermined format (e.g., MPEG-4). Adapter layer 140, in such an embodiment, would convert the video content from the format provided by third-party system 200 into the specific format supported or accepted by EGSS user interface 170. In some embodiments, the expectations are for minimization of this element by maintaining a comprehensive and complete API 130, which requires the solution provider's third-party system 200 to perform any conversions required to be compliant with EGSS 100 and associated services.

Router 150:

EGSS 100 may further comprise a router 150 for determining which agency 300 should receive communications from a given third-party system 200 when an event is initiated, and for directing communications accordingly. In an embodiment, router 150 may be configured to select an appropriate agency 300 based at least in part on information concerning a location of the event as provided by third-party system 200. For example, in an embodiment, router 150 may utilize location information provided by a person's smartphone 222 to identify the closest agency 300 with EMS response capabilities, and direct further communications from third-party system 200 to that agency 300. In another embodiment, router 150 may select an appropriate agency 300 by additionally or alternatively considering information concerning the nature of the event as provided by third-party system 200. For example, in an embodiment, a third-party system 200 designed for commercial security solutions may send information identifying the event as a burglary (e.g., based on detecting an motion sensor alarm) or a fire (e.g., based on detecting a smoke alarm), which router 150 may utilize to route communications from the software application to an agency 300 with police or fire response capabilities, respectively. This nature-of-the-event-based routing may in some cases be preferable, as the closest agency 300 may not be capable or well-equipped for responding to the particular event.

Router 150 may further serve to transfer communications with a given software application from a first agency 300a to a second agency 300b, as later described in more detail.

Message Broker 160:

One or more message brokers 160 may be provided for converting the message protocol (as opposed to the "data" of the message with respect to adapter layer 140) received from third-party system 200, so that it may be compatible with EGSS user interface 170. Additionally or alternatively, message broker(s) 160 may be configured to manage a message queue. For example, during an event, agent 310 (e.g., an operator) may have several different agents 310 (e.g., responding units) and devices 220 sending information 102 via EGSS 100, and message broker 160 may be used to manage the associated message queue.

Figure 6:
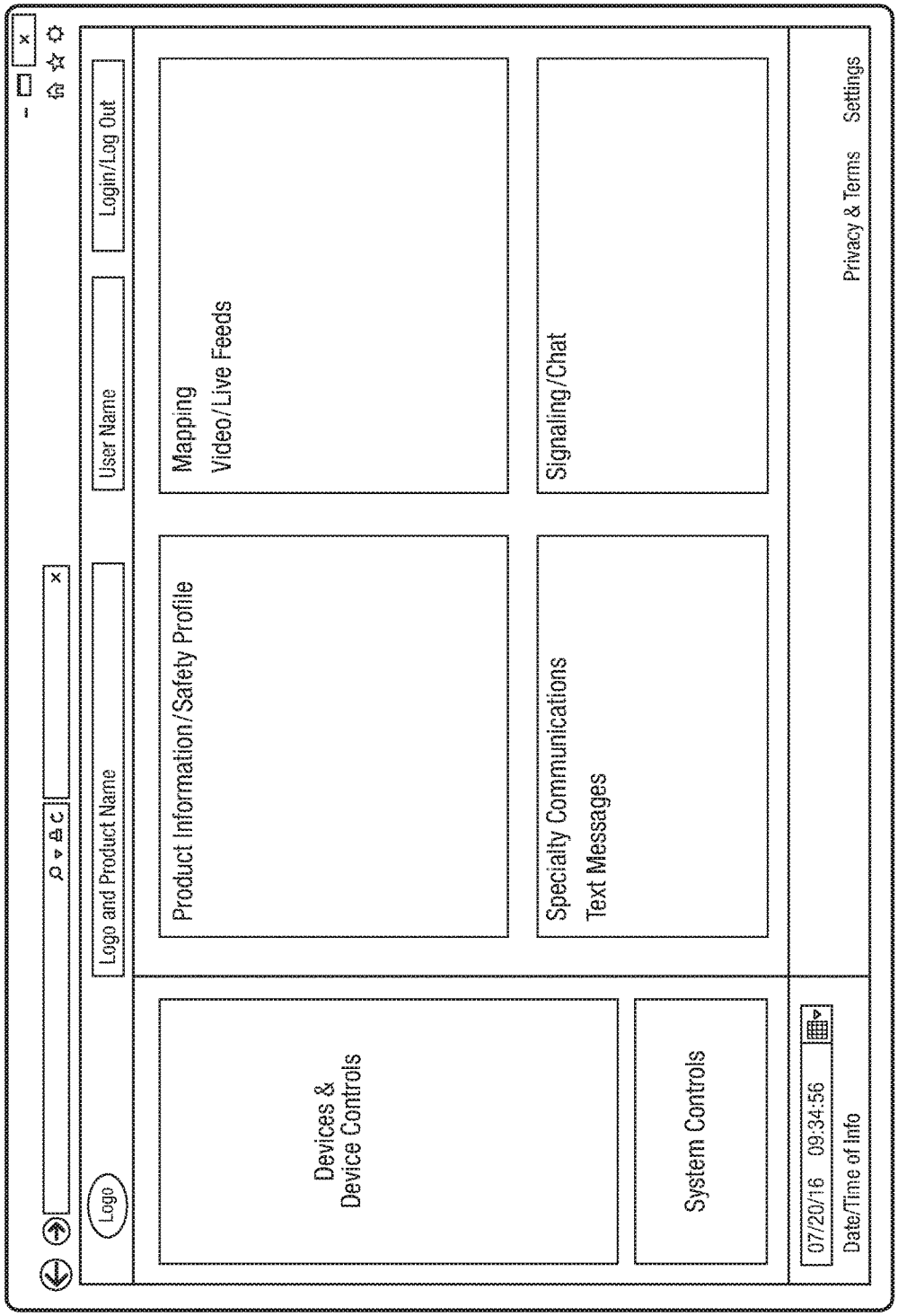
FIG. 6 depicts a representative user interface generated by a system for providing information concerning an emergency event to a responding agency, in accordance with one embodiment of the present disclosure.

EGSS User Interface 170:

Referring ahead to FIG. 6, the EGSS user interface module 170 receives processed information from broker(s) 160, and presents it in a user interface at the appropriate agency 300. The EGSS interface module 170, in various embodiments, may provide the information 102 in a standardized display, regardless of how the information is displayed in third-party system 200. This enables responding agents to accept numerous solutions by eliminating the need to train and stay current on numerous different user interfaces.

FIG. 6 illustrates a representative user interface 170 for displaying information 102 from third-party system 200 to an agent 310 at agency 300. In the embodiments shown, user interface 170 provides a command center of sorts, with several sections directed to various types of information 102. For example, user interface 102 may include separate sections for presenting information 102 such as profile information, video feeds, text messages, and signaling/chat. One or more of these sections may additionally provide for the agent 310 to interact with third-party system 200 via EGSS 100. For example, user interface 170 may include interactive capabilities providing for the agent 310 to enter text, zoom in/out on a map showing location information, stream video, send instructional content, and/or control one or more of devices 220.

While EGSS 100 may, from time to time throughout the present disclosure, be described in the context of facilitating communication of information 102 to an agent 310 in a coordinator role (e.g., a dispatcher), it should be recognized that, in various embodiments, EGSS 100 may be configured to provide information 102 directly to agents 310 in responding roles (e.g., responding units, such as police officers or firefighters). EGSS 100, in various embodiments, may be configured to provide information 102 to agents 310, regardless of their particular role, via a corresponding instance of user interface 170 operating on a computing device monitored by agent 310. For example, in an embodiment, EGSS 100 may facilitate the communication of information 102 to a laptop in an agent's 310 vehicle (e.g., police car), or to other mobile devices (e.g., tablet, smartphone) worn or carried by agent 310.

Processing and Routing Data with EGSS 100

Figure 7:
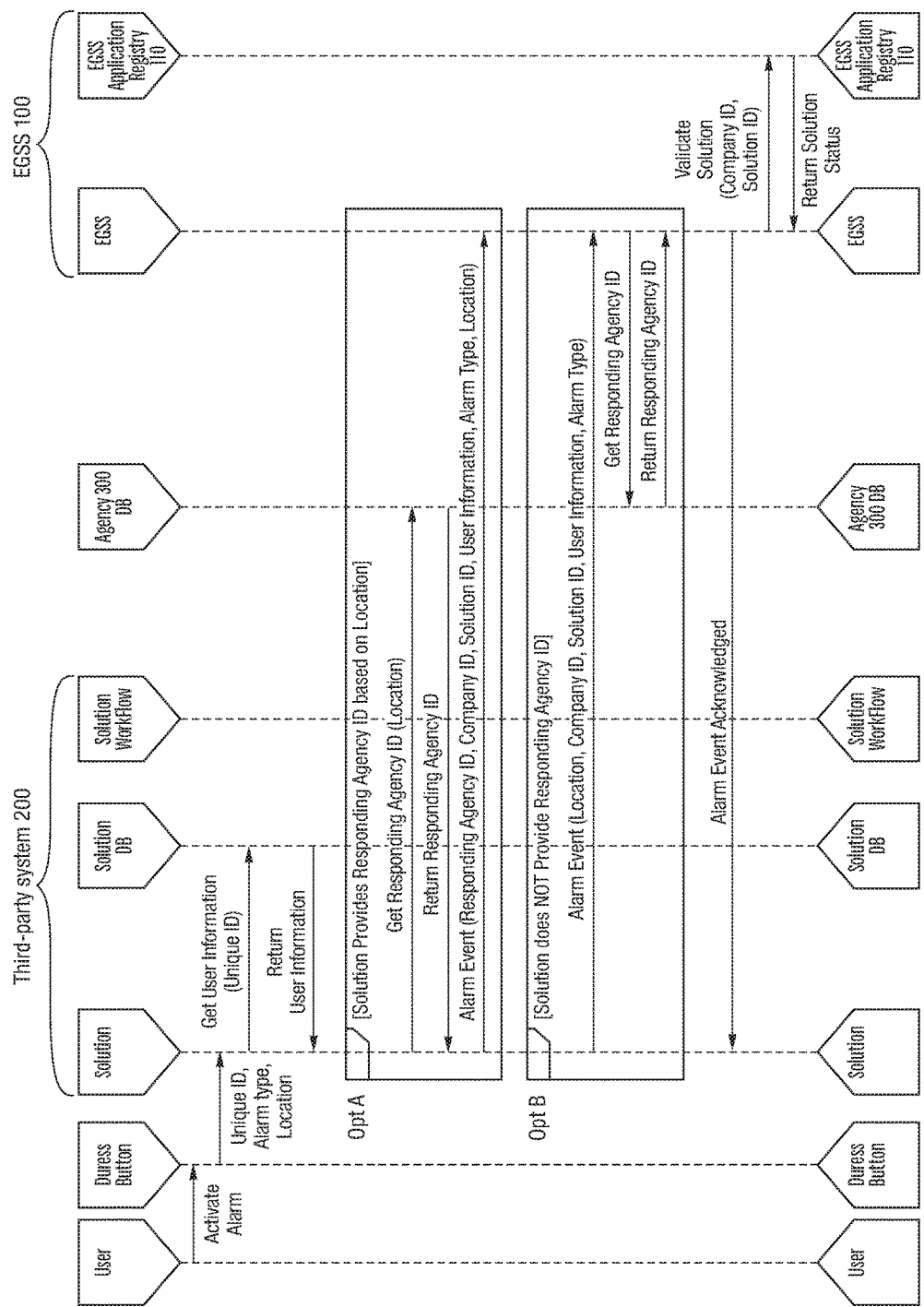
FIG. 7 depicts a representative workflow for routing an emergency event to a responding agency, in accordance with one embodiment of the present disclosure.

Referring now to FIG. 7, a flowchart is provided to illustrate representative embodiments in which EGSS 100 routes an event to agency 300.

In both representative embodiments, the process begins with a user triggering an event in third-party system 200. For example, a user of third-party system 200 may trigger the event by, for example, pressing a duress button in a user interface of the third-party system 200 running on the user's smartphone 222.

In a first embodiment, identified in FIG. 7 as "Opt A", third-party system 200 provides to EGSS 100 a unique identifier (e.g., identification number) for an appropriate agency 300 to which to route information 102. In some cases, the user may have preselected an appropriate agency 300 to which to route all such alarms. For example, a user of third-party system 200, such as a bank, may have preselected the local police department and/or the nearest field office of the FBI as the agency 300 to which to direct robbery alarms. In other cases, third-party system 200 may be configured to determine the appropriate agency 300 using location information from smart phone 222 and looks up the corresponding unique identifier. Of course, third-party software application may determine the unique identifier using any other suitable approach known in the art.

The unique identifier, along with other information 102 such as the type of alarm (e.g., medical emergency, robbery) and a location of the user's smartphone 222, are then provided to EGSS 100.

In a second embodiment, identified in FIG. 7 as "Opt B", third-party system 200 does not provide a unique identifier for an appropriate agency 300, and instead provides information to EGSS 100 that is suitable for determining, with EGSS 100, the appropriate agency 300 to which to route information 102. For example, software application 100 may provide a location of the user's smartphone, and EGSS 100 uses the location information to look up the unique identifier for the nearest agency 300. Other relevant information, such as user information and alarm type, could also be provided, to enable EGSS 100 to choose the closest agency that is capable (or best able to) respond to the particular event.

Once the appropriate agency 300 is determined, EGSS 100 may send an acknowledgement to third-party system 200, and proceed to validate, via application registry 110, whether third-party system 200 is registered and in good standing with EGSS 100.

Figure 8A:
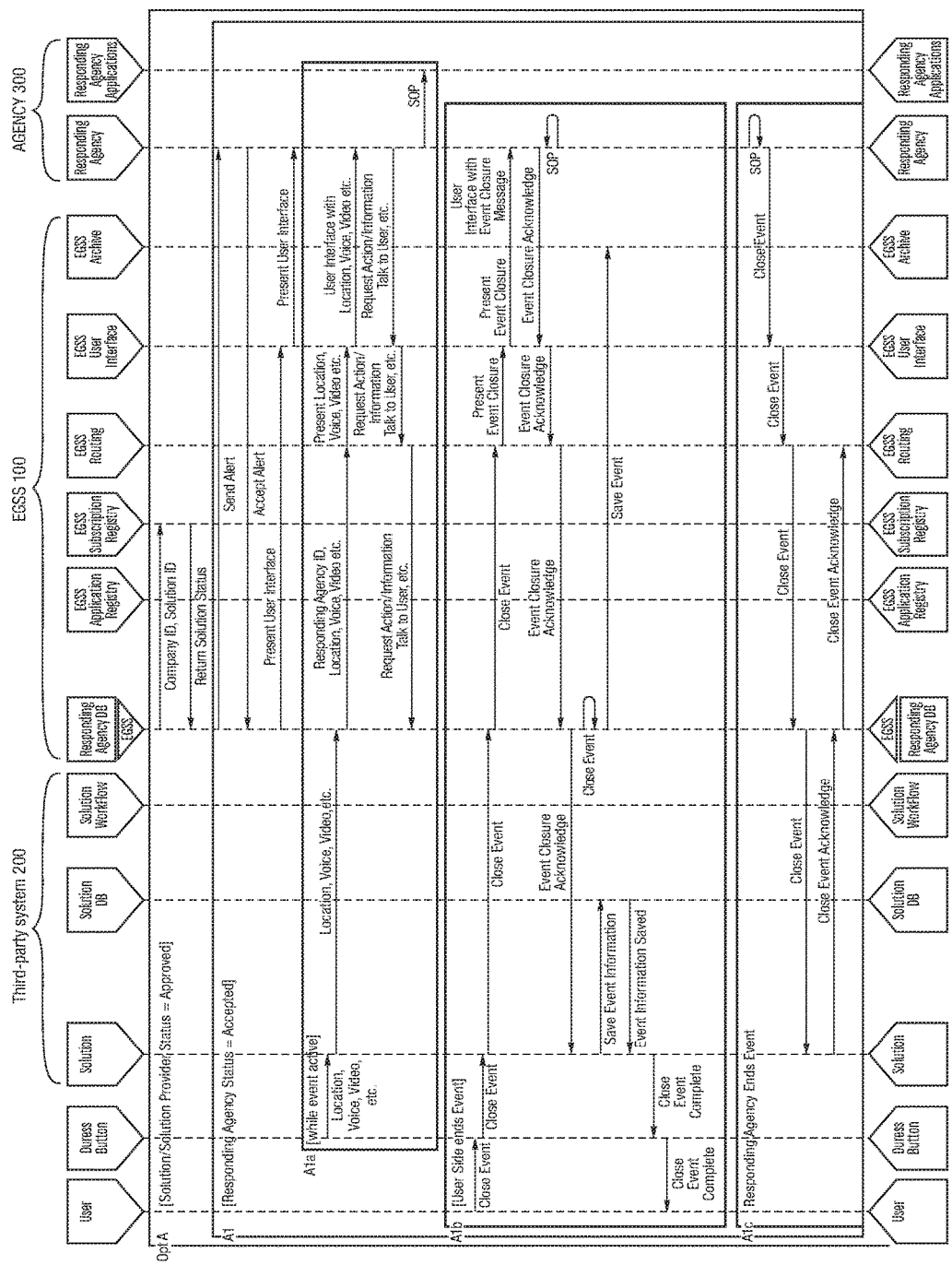
FIGS. 8A and 8B depict a representative workflow for processing an emergency event and associated information 102, in accordance with one embodiment of the present disclosure.
Figure 8B:
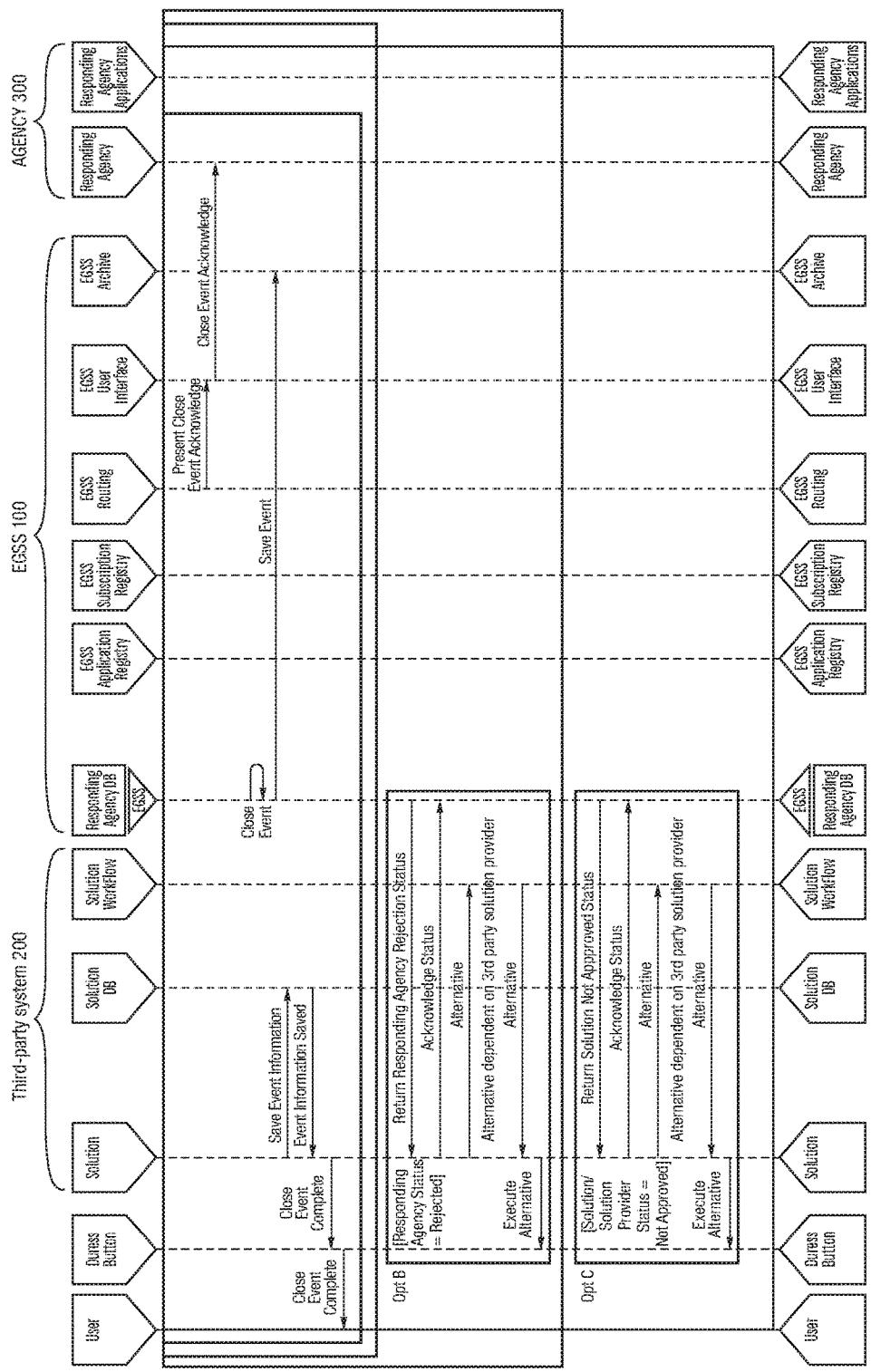

Referring now to FIGS. 8A and 8B, the flowchart of FIG. 7 continues, and now illustrates representative embodiments for processing the event and associated information 102 with EGSS 100. Because of space and size limitations, this portion of the representative overall workflow has been split into two sections, with a first section depicted in FIG. 8A and a second section depicted in FIG. 8B.

A first scenario, in which the aforementioned validation step indicates that third-party system 200 is approved (i.e., registered and in good standing), is identified as "Opt A" in FIG. 8A and continuing into an upper portion of FIG. 8B.

As shown in section A1 of FIG. 8A, upon determining the third-party system 200 is approved, EGSS 100 may then check whether agency 300 has registered software solution 200. By registering for software solution 200, the agency has indicated its willingness to process events using that particular software solution 200.

Referring to section A1*a* of FIG. 8A, while the event is active, third-party system 200 may continue to provide information 102 to EGSS 100, which in turn acts as a gateway to process and route information 102 to agency 300. In the representative embodiment shown, adapter layer 140 and message broker 160 of EGSS 100 process normalizes and converts information 102, respectively, as necessary, and router 150 routes this processed information 102 to agency 300 for presentation on user interface 170.

In the representative embodiment shown, EGSS 100 is configured to provide for agent 310 to request actions and information 102 from third-party system 200, as well as to initiate communications with the user of third-party system 200. EGSS 100 may operate in a similar, albeit reverse, manner to process (e.g., normalize format and convert message protocol) and route these requests and communications back to third-party system 200 and the user.

These functions may continue to occur while the event is active, thereby providing updated information 102 to agency 300 and enhancing the situational awareness of agent 310.

Referring now to section A1*b* of FIG. 8A and section A1*c* of FIGS. 8A and 8B, representative workflows are shown for winding down and ending the event. The workflow of section A1*b* depicts a scenario in which application 200 (or a user therof) ends the event. Here, the user may, for example, press a corresponding "end event" button in its user interface, which prompts third-party system 200 to send an event closure notification to EGSS 100. EGSS 100, in turn, presents user interface 170 with an event closure message, and agent 310 acknowledges. The acknowledgement is routed back through EGSS 100 to third-party system 200, and if desired, third-party system 200 and EGSS 100 may save information concerning the event to their respective databases. The workflow of section A1*c* depicts an alternative scenario in which agency 300 (or an agent 310 thereof) ends the event. This workflow is substantially similar to the workflow of section A1*b*, but in reverse, as shown.

Alternative scenarios are identified as "Opt B" and "Opt C", and illustrate workflows should the status of agency 300 or solution 200 be rejected, respectively. In these scenarios, EGSS 100 may notify the party of its rejected validation, and in some cases, execute an alternative event response that does not include EGSS 100.

Inter Agency Event Transfer & Coordination with EGSS 100

Figure 9:
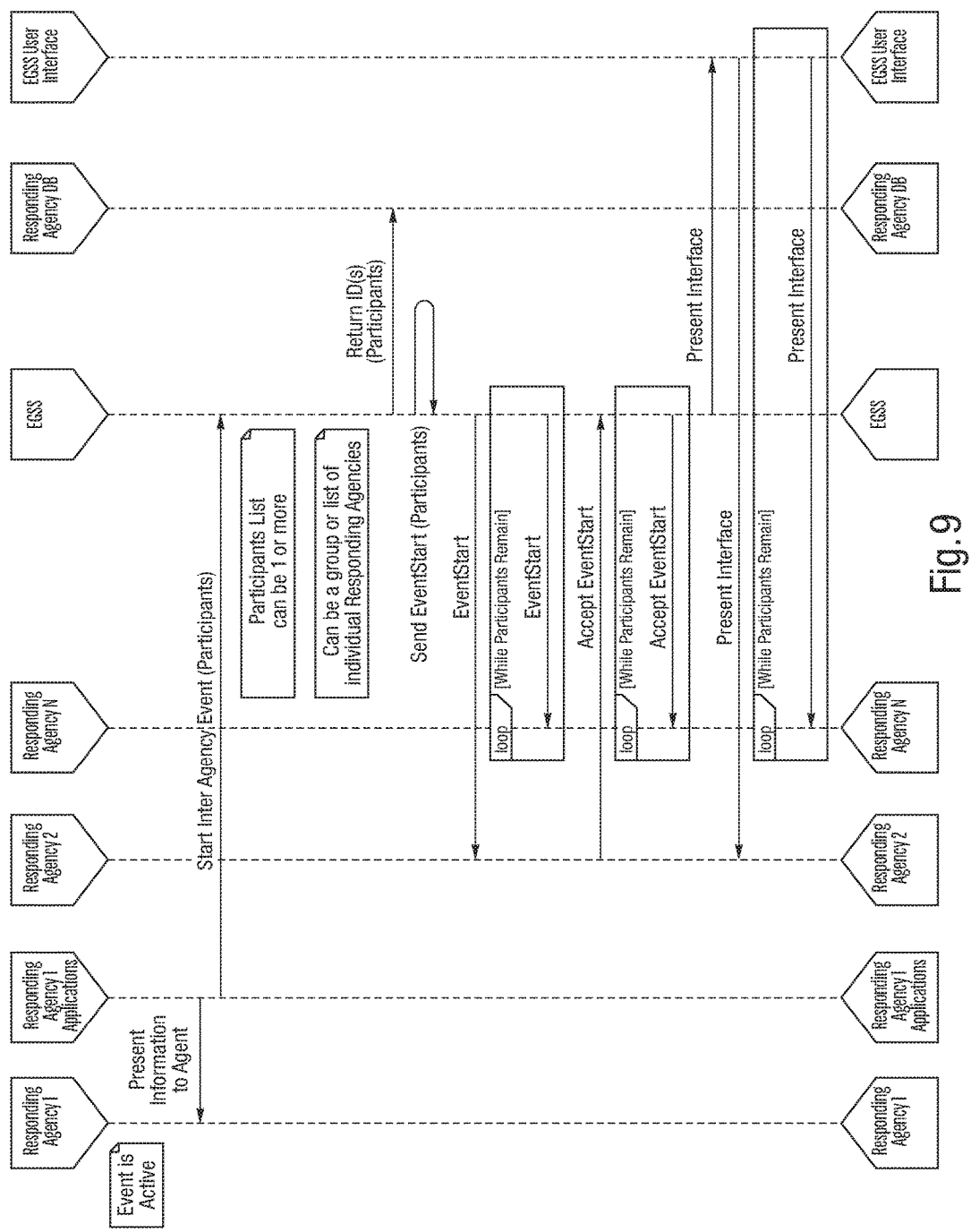
FIG. 9 depicts a representative workflow for facilitating the transfer of events from one agency to another agency, in accordance with one embodiment of the present disclosure.

Referring now to FIG. 9, EGSS 100, in various embodiments, may be configured to facilitate the transfer of events (and in particular, information 102 received from third-party system 200), from one agency 300 to another agency 300 as the event progresses.

Transfer is envisioned between any number and combination of agencies 300. EGSS 100, in an embodiment, may facilitate the transfer of events from PSAP to PSAP. For example, a PSAP in county X could transfer an event to a PSAP in county Y when a suspect in a high-speed chase crosses into county Y. In another embodiment, EGSS 100 may facilitate the transfer of events from a PSAP to a non-PSAP (e.g., law enforcement agency, public safety agency, private entity). For example, a PSAP could transfer a bank robbery event (e.g., surveillance camera feed) to the FBI when the FBI arrives on-scene. In yet another embodiment, EGSS 100 may facilitate the transfer of events from a non-PSAP to a PSAP or another non-PSAP. For example, a home monitoring services company could transfer a burglary event (e.g., wi-fi camera feed) to police dispatch and/or responding police officers prior the officers entering the home.

As used herein, transferring an event may refer to any combination of transferring access to information 102 provided by third-party system 200, and transferring interactive control over the information 102 sent by/to third-party system 200 from an agency 300. Further, the term "transferring agency 301" refers to a PSAP that is currently responsible for the event and is seeking to transfer the event to another PSAP. The term "receiving agency 302" refers to a PSAP to which the event is to be transferred from a transferring agency 301.

EGSS 100, in an embodiment, may be configured to pass the transferring agency's 301 session to the receiving agency 302, such that the receiving agency 302 views information 102 as presented in the format provided in transferring agency's 301 EGSS user interface 170. In another embodiment, EGSS 100 may additionally or alternatively be configured to transfer the event to a user interface 170 set up by and customized to the preferences of the receiving agency 302. In this way, the receiving agency 302 receives the information 102 in its preferred standardized format, rather than in the preferred format of the transferring agency 301.

FIG. 9 illustrates a representative event transfer workflow associated with the second transfer scenario presented in the preceding paragraph. In this example, agent 310 at the transferring agency 301 may be responsible for executing the inter-agency transfer to the receiving agency 302. The transferring agency 301'*s* agent may first identify the receiving agency 302'*s* unique identifier (e.g., identification number), and enter it into EGSS 100 when the EGSS function for transferring event control is invoked.

EGSS 100, in some embodiments, may be configured to allow the transferring agency 301 to remain a participant in the event, rather than fully disengaging from the event when the event is transferred to the receiving agency 302. If the transferring agency 301 prefers to remain an event participant, then its agent may continue to receive information 102 during the event, but may no longer have the permissions to interact with the solution in use.

In an embodiment, if the receiving agency 302 is registered to accept the third-party system 200 in use, then the receiving agency 302 may receive the transfer event and accepts the event. If the receiving agency 302 is not registered to accept third-party system 200 in use, the transferring agency 301 may receive a notification of this fact and the event is not transferred.

EGSS 100, in various embodiments, may be configured to transfer the event to any suitable number of receiving agencies 302 throughout the response to the event. If the event once again passes to another jurisdiction, the new transferring agency 301 (formerly a receiving agency 302) can once again attempt to pass control to the new receiving agency 302 using the same or similar procedures with the new receiving agency's 302 identification. Regardless of the number of transfers, the agency 300 in control of the event when it is completed may be responsible for closing the event.

All interaction with the system, including all transfer related information, is logged within EGSS 100, either automatically or manually through user interface 170 of the last agency 300 in control of the event.

Inter Agency Crisis Management with EGSS 100

Figure 10A:
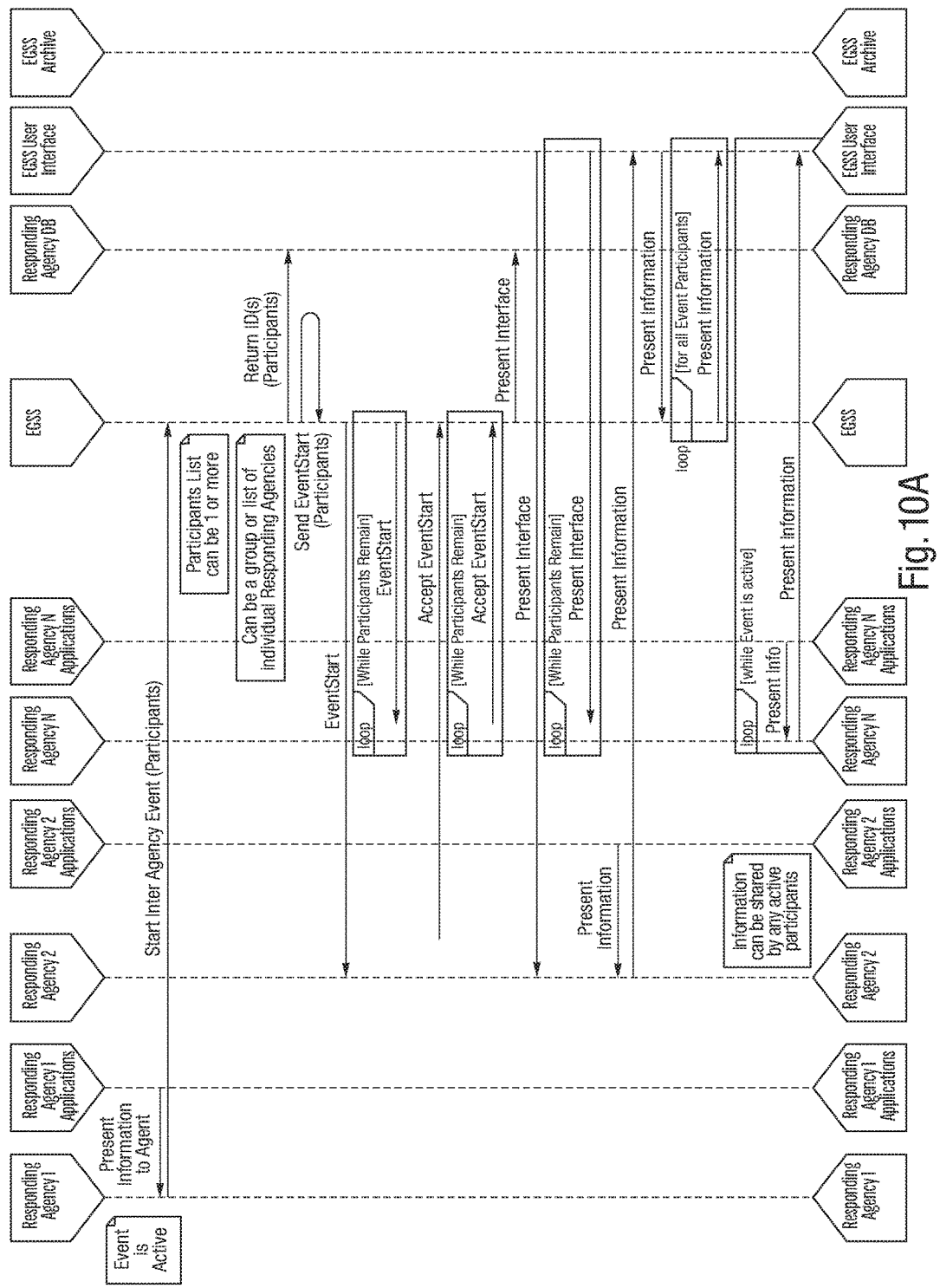
FIGS. 10A and 10B depict a representative workflow for facilitating communication and alignment of multi jurisdiction and multi-agency resources in response to a localized, regional, country-wide or global event, in accordance with one embodiment of the present disclosure.
Figure 10B:
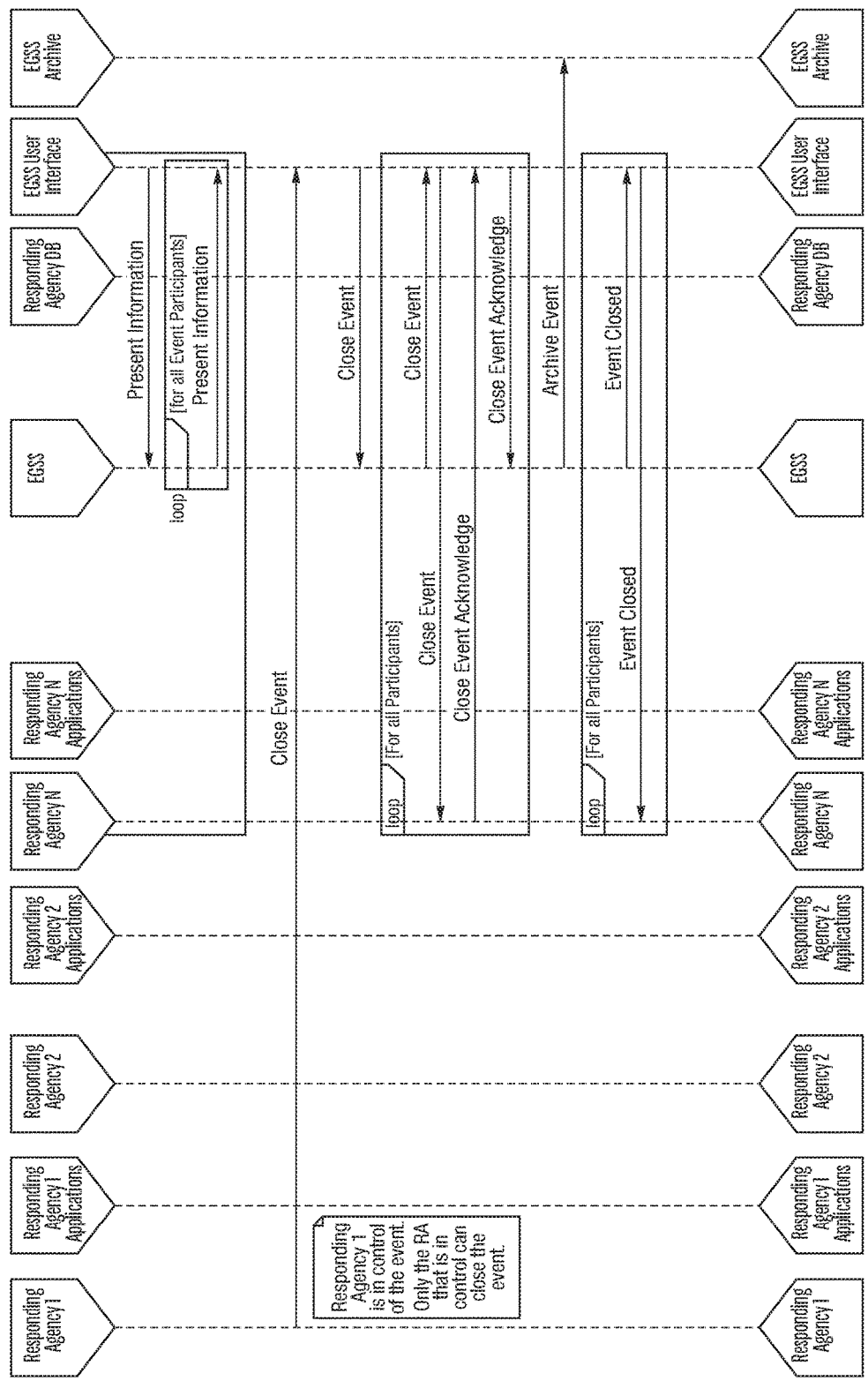

Referring now to FIGS. 10A and 10B, EGSS 100 may additionally or alternatively be configured to support interagency event coordination to facilitate communication and alignment of multi jurisdiction and multi-agency resources in response to a localized, regional, country-wide or global event.

The originating agency 301, in various embodiments, would use user interface 170 to initiate the inter-agency event. The originating agency 301 would push out all related information to one or more receiving agencies 302, possibly including one or more of information 102, information acquired from the originating agency's own systems, and information received from external sources delivered to the originating agency.

EGSS 100, in various embodiments, may be configured such that the originating agency 301 would be able to send information to a single receiving agency 302, to a group or groups of receiving PSAPS 302, and/or to all receiving agency 302 registered with EGSS 100.

User interface 170, in various embodiments, may be used with the following additions or expansions: 1) Information may have the supplying receiving agency 302 identified, 2) Agents 310 may have the ability to select the information they would like to view from a given transferring agency(s) 301 at either an all content or a specific content type (e.g., video, audio, location), 3) Each content type can be extended to individual content panes (i.e. a video wall, a multi-chat wall, map wall, etc.).

Static and dynamic agency groups can be created to support effective and efficient communication and coordination. Example agency groups may include city, state, region or agency-specific groups.

Control of the event can be transferred by the originating agency 301 (or by any PSAP to which control has been transferred and is now acting as a transferring agency 301) by identifying the appropriate receiving agency 302 and sending a control change message, as previously described. Once the receiving agency 302 accepts event control, ownership is transferred. Until ownership is transferred, the originating/transferring agency 301 may remain in control of the event. Regardless of the number of transfers, the agency 300 in control of the event when it is completed may be responsible for closing the event.

All interaction with the system, including all transfer related information, may be automatically or manually logged within EGSS 100. Events and all associated information may be archived within EGSS.

A representative inter-agency crisis management workflow has been illustrated in parts, due to space considerations in the figures, in FIGS. 10A and 10B. In the embodiment shown, an originating agency 301 receives information from software application(s) 200 during an active event that identifies a broader crisis. Originating agency 301 sends a list of affected agencies 302 to EGSS 100 with the request to start the interagency event. The flow highlights the process for starting an event with an originating agency 301 and then identifies the process for starting an event that includes multiple receiving agencies 302. Each agency 302 may join in the event upon acknowledging a transfer request. Each active agency 300 receives and sends information using the EGSS user interface 170.

Agency 301 starts the inter-agency event by submitting the event creation request to EGSS 100 via user interface 170. agency 301 provides the list of agencies 302 it would like to join the event. EGSS 100 sends each agency 302 in the list an event start message. Agencies 302 accept the event start and are joined to the event. EGSS interface 170 provides the content and provides the ability for the various agencies 300 to communicate during the event. Each agency 300 can send and receive information during the event. The agency 300 in control of the event initiates the event closure. Each active agency 300 is sent a close event message, which they acknowledge. EGSS 100 closes the event and archives all related information.

Control of the event can be passed among agencies 300 in the same way control can be passed in a non-interagency event. Control in this use case identifies the transferring agency 301 that can modify the parameters of the event (i.e. add/remove event responding agencies 302) and close the event.

While the present invention has been described with reference to certain embodiments thereof, it should be understood by those skilled in the art that various changes may be made and equivalents may be substituted without departing from the true spirit and scope of the invention. In addition, many modifications may be made to adapt to a particular situation, indication, material and composition of matter, process step or steps, without departing from the spirit and scope of the present invention. All such modifications are intended to be within the scope of the claims appended hereto.

What is claimed is:

1. A non-transitory computer-readable medium storing instructions that, when executed on a computing device, cause the computing device to perform a method for communicating non-voice information from a third-party system to a responding agency, the method comprising:

registering, in advance of an emergency event, one or more types of non-voice information concerning the emergency event that will be provided by a third-party system during the emergency event, wherein at least some of the non-voice information is captured by an electronic device of the third-party system and includes one or more of: (i) a location of the electronic device, (ii) audio, visual, and/or text content captured by the electronic device, and (iii) sensor readings captured by the electronic device;

selecting, in advance of the emergency event, which of the type(s) of non-voice information registered by the third-party system are accepted by a responding agency and registering the selected type(s);

receiving, from the third-party system, non-voice information of the one or more registered type(s) concerning the emergency event;

identifying, based on the advance registrations, which of the non-voice information received from the third-party system is of the one or more types accepted by the responding agency;

filtering out any of the non-voice information received from the third-party system that is not identified as being of the one or more types accepted by the responding agency; and directing only the non-voice information identified as being of the one or more types accepted by the responding agency to the responding agency, wherein the directed non-voice information provides enhanced situational awareness regarding the emergency event to a responding agent at the responding agency.

2. A non-transitory computer-readable medium as set forth in claim 1, wherein the sensor readings captured by the electronic device include one or more of inertial sensor readings, vital sign readings, and environmental sensor readings.

3. A non-transitory computer-readable medium as set forth in claim 1, wherein the information concerning a location of the electronic device includes at least one of latitude/longitude coordinates of the electronic device, a physical address at which the electronic device is located, and a location of the electronic device within a building or relative to one or more recognizable landmarks or objects.

4. A non-transitory computer-readable medium as set forth in claim 1, wherein the electronic device includes at least one of a camera, a microphone, a GNSS/GPS module, an inertial sensor, a vital sign sensor, and an environmental sensor.

5. A non-transitory computer-readable medium as set forth in claim 1, wherein the electronic device is a mobile device selected from a group consisting of a smart phone, a tablet, laptop computer, a wearable device, or a remotely-piloted device.

6. A non-transitory computer-readable medium as set forth in claim 1, wherein the electronic device is an Internet-of-Things connected device.

7. A non-transitory computer-readable medium as set forth in claim 1, wherein non-voice information identified as being of the one or more types accepted by the responding agency is directed to the responding agency via a broadband internet connection independent of traditional voice telephony infrastructure used for voice calls to the responding agency.

8. A non-transitory computer-readable medium as set forth in claim 1, further including converting a message protocol used to transmit the non-voice information identified as being of the one or more types accepted by the responding agency into a predetermined message protocol supported by the responding agency.

9. A non-transitory computer-readable medium as set forth in claim 1, further including generating a user interface for presenting the non-voice information identified as being of the one or more types accepted by the responding agency to a responding agent at the responding agency.

10. A non-transitory computer-readable medium as set forth in claim 9, wherein the user interface is configured to receive input from the responding agent for sending at least one of electronic communications to the electronic device, requests for information from the electronic device, and commands for controlling the electronic device.

11. A non-transitory computer-readable medium as set forth in claim 9, wherein the user interface is configured to present the non-voice information identified as being of the one or more types accepted by the responding agency to the responding agent according to a standardized display template regardless of how the corresponding non-voice information may be displayed by the third-party system.

12. A non-transitory computer-readable medium as set forth in claim 9, further including generating one or more additional instances of the user interface for presenting the non-voice information to additional agents associated with the agency.

13. A non-transitory computer-readable medium as set forth in claim 9, further including share access to the responding agency's session with one or more additional agencies in response to receiving, via the user interface, instructions from the responding agent.

14. A non-transitory computer-readable medium as set forth in claim 9, further including:
  selecting, in advance of the emergency event, which of the type(s) of non-voice information registered by the third-party system will be accepted by a second responding agency and registering the selected type(s);
  receiving, via the user interface, instructions from the responding agent to transfer or share access to the non-voice information received from the third-party system with the a second responding agency;
  identifying, based on the advance registrations, which of the non-voice information received from the third-party system is of the one or more types accepted by the second responding agency;
  filtering out any of the non-voice information received from the third-party system that is not identified as being of the one or more types accepted by the second responding agency; and
  directing only the non-voice information identified as being of the one or more types accepted by the second responding agency to the second responding agency.

15. A non-transitory computer-readable medium as set forth in claim 14, further including generating a user interface for presenting the non-voice information directed to the second responding agency to a responding agent at the second responding agency.

16. A non-transitory computer-readable medium as set forth in claim 1,
  wherein the step of registering further includes registering, for each of the one or more types of non-voice information registered as being provided by a third-party system, one or more corresponding formats in which the registered type(s) of information will be provided by the third-party system,
  wherein the step of selecting further includes selecting which of the registered corresponding format(s) will be accepted by the responding agency and registering the selected format(s);
  identifying, based on the advance registrations, which of the non-voice information received from the third-party system is not of a format accepted by the responding agency; and
  normalizing a format of the non-voice information identified as being not of a format accepted by the responding agency into the format accepted by the responding agency.

17. A non-transitory computer-readable medium as set forth in claim 1, wherein the step of selecting includes selecting a subset of the one or more types of non-voice information registered by the third-party system if all registered types are not desired by the responding agency or compatible with the responding agency's infrastructure or policies.

* * * * *